(12) United States Patent
Herbst et al.

(10) Patent No.: US 12,507,632 B2
(45) Date of Patent: Dec. 30, 2025

(54) CONCAVE ASSEMBLY WITH COVER MECHANISM

(71) Applicant: DEERE & COMPANY, Moline, IL (US)

(72) Inventors: Garrick W. Herbst, Bettendorf, IA (US); Michal Kocis, Martin Zilina (SK); Martin Kollar, Martin Zilina (SK); Jesus Landinez, Salt Lake City, UT (US)

(73) Assignee: DEERE & COMPANY, Moline, IL (US)

( * ) Notice: Subject to any disclaimer, the term of this patent is extended or adjusted under 35 U.S.C. 154(b) by 684 days.

(21) Appl. No.: 17/819,010

(22) Filed: Aug. 11, 2022

(65) Prior Publication Data

US 2024/0049645 A1 Feb. 15, 2024

(51) Int. Cl.
*A01F 12/26* (2006.01)
*A01F 12/28* (2006.01)

(52) U.S. Cl.
CPC .............. *A01F 12/26* (2013.01); *A01F 12/28* (2013.01)

(58) Field of Classification Search
CPC . A01F 12/26; A01F 12/28; A01F 7/02; A01D 41/06
See application file for complete search history.

(56) References Cited

U.S. PATENT DOCUMENTS

| | | |
|---|---|---|
| 3,537,459 A | 11/1970 | Thomas |
| 3,631,862 A | 1/1972 | Rowland-Hill |
| 4,968,284 A | 11/1990 | Klimmer et al. |
| 5,334,093 A | 8/1994 | Jensen et al. |
| 5,338,257 A | 8/1994 | Underwood |
| 6,358,142 B1 * | 3/2002 | Imel .................. A01F 12/28 460/109 |
| 6,802,771 B2 | 10/2004 | Schwersmann et al. |
| 6,932,697 B2 | 8/2005 | Baumgarten et al. |
| 7,153,204 B2 | 12/2006 | Esken et al. |
| 7,771,260 B2 | 8/2010 | Ricketts et al. |
| 8,118,649 B1 | 2/2012 | Murray et al. |

(Continued)

FOREIGN PATENT DOCUMENTS

| | | |
|---|---|---|
| BR | 102020018945 A2 | 3/2022 |
| CN | 104855058 A | 8/2015 |

(Continued)

OTHER PUBLICATIONS

Screen captures from YouTube video clip entitled "Claas APS Synflow Hybrid Crop Flow", 2 pages, uploaded on Jun. 18, 2021. Retrieved from Internet: <https://www.youtube.com/watch?v=SaRRtAAcfR4&list=TLGGVZwPGPbDb3oxNzEyMjAyMQ>.

(Continued)

*Primary Examiner* — Arpad Fabian-Kovacs

(57) ABSTRACT

A concave assembly for an agricultural combine harvester comprises a concave, a cover, and a cover actuator. The concave comprises a grate. The cover has an opened position uncovering at least a portion of the grate to allow crop flow through the at least the portion of the grate and a closed position covering the at least the portion of the grate to block crop flow through the at least the portion of the grate. The cover actuator comprises a four-bar linkage and moves the cover between the opened position and the closed position.

14 Claims, 11 Drawing Sheets

(56) References Cited

U.S. PATENT DOCUMENTS

| | | | |
|---|---|---|---|
| 8,133,100 B2 | 3/2012 | Regier et al. | |
| 9,155,249 B2 | 10/2015 | Baumgarten et al. | |
| 9,345,197 B2 | 5/2016 | Biggerstaff et al. | |
| 9,445,546 B2 | 9/2016 | May | |
| 9,763,390 B2 | 9/2017 | Matway et al. | |
| 10,045,487 B1 * | 8/2018 | Robertson | A01F 12/185 |
| 10,104,840 B2 | 10/2018 | Duquesne et al. | |
| 10,869,427 B2 | 12/2020 | Robertson | |
| 10,905,050 B2 | 2/2021 | Robertson | |
| 11,067,994 B2 | 7/2021 | Borgstadt | |
| 11,497,171 B2 * | 11/2022 | Theisen | A01F 12/26 |
| 11,877,538 B1 * | 1/2024 | Calmer | A01F 12/446 |
| 11,997,952 B2 * | 6/2024 | Robertson | A01F 12/28 |
| 2004/0224737 A1 | 11/2004 | Esken et al. | |
| 2005/0176484 A1 * | 8/2005 | Schenk | A01F 12/28 |
| | | | 460/109 |
| 2014/0335923 A1 | 11/2014 | Biggerstaff et al. | |
| 2015/0156971 A1 | 6/2015 | May | |
| 2017/0196169 A1 | 7/2017 | Duquesne et al. | |
| 2018/0359926 A1 * | 12/2018 | Estes | A01F 11/06 |
| 2019/0166767 A1 * | 6/2019 | Robertson | A01F 12/185 |
| 2019/0166768 A1 * | 6/2019 | Robertson | A01F 12/185 |
| 2019/0387681 A1 | 12/2019 | Theisen et al. | |
| 2020/0253126 A1 | 8/2020 | Robertson | |
| 2021/0015048 A1 | 1/2021 | Kile | |
| 2021/0084818 A1 | 3/2021 | Poelling et al. | |
| 2021/0311485 A1 | 10/2021 | Borgstadt | |
| 2021/0360860 A1 | 11/2021 | Robertson | |
| 2024/0065170 A1 * | 2/2024 | Meschke | A01F 12/26 |
| 2024/0065171 A1 * | 2/2024 | Meschke | A01F 12/28 |

FOREIGN PATENT DOCUMENTS

| | | | | |
|---|---|---|---|---|
| CN | 204721883 U | * | 10/2015 | A01F 12/44 |
| CN | 207040270 U | | 2/2018 | |
| CN | 110149917 A | | 8/2019 | |
| CN | 209218663 U | | 8/2019 | |
| DE | 6919051 U | | 9/1969 | |
| DE | 3832996 A1 | | 4/1989 | |
| DE | 19525244 A1 | | 1/1997 | |
| DE | 20302925 U1 | * | 10/2003 | A01D 41/1276 |
| DE | 19525244 C2 | | 11/2003 | |
| DE | 102011051215 A1 | | 12/2012 | |
| EP | 0085358 A1 | * | 8/1983 | A01F 12/24 |
| EP | 1474964 A1 | * | 11/2004 | A01F 12/28 |
| EP | 1479280 A1 | | 11/2004 | |
| EP | 1284098 B1 | | 11/2006 | |
| EP | 1449425 B1 | | 9/2008 | |
| EP | 2327290 A2 | * | 6/2011 | A01F 12/24 |
| EP | 2537404 B1 | | 6/2017 | |
| JP | 2017051108 A | | 3/2017 | |
| RU | 2023375 C1 | * | 11/1994 | A01F 12/24 |
| RU | 2604512 C2 | * | 12/2016 | A01F 12/181 |
| RU | 189040 U1 | | 5/2019 | |
| WO | WO-2021222229 A1 | * | 11/2021 | A01F 12/181 |

OTHER PUBLICATIONS

Screen captures from YouTube video clip entitled "Claas Lexion Concave Flaps", 2 pages, uploaded on Jun. 18, 2021. Retrieved from Internet: <https://www.youtube.com/watch?v=pUKiLrhthrU&list=TLGGnZA04i7DftgxNzEyMjAyMQ>.

John Deere Manual Covers, Dec. 20, 2021, 2 pages.

New Holland CH Flaps with Manual Actuation, May 4, 2022, 2 pages.

John Deere Flap Actuation Image, May 5, 2022, 1 page.

Screen captures from YouTube video clip entitled "MDW Harvest Master 527 STS", 3 pages. Retrieved from Internet: <https://youtu.be/bf8-EIVMoW8?list=PLpTnMYmC5HYd9iBvByjvIUTFDzmgKKpvv&t=63>.

* cited by examiner

CONCAVE ASSEMBLY WITH COVER MECHANISM

TECHNICAL FIELD

The present disclosure relates to concave assemblies for agricultural combine harvesters.

BACKGROUND

An agricultural combine harvester intakes crop gathered from a field and processes the crop. Many combine harvesters have a threshing and separating assembly with a concave assembly and a rotor that cooperates with the concave assembly to thresh the crop and separate grain from crop residue (material other than grain).

SUMMARY

According to an aspect of the present disclosure, there is disclosed a concave assembly for an agricultural combine harvester. The concave assembly comprises a concave, a cover, and a cover actuator. The concave comprises a grate. The cover has an opened position uncovering at least a portion of the grate to allow crop flow through the at least the portion of the grate and a closed position covering the at least the portion of the grate to block crop flow through the at least the portion of the grate. The cover actuator moves the cover between the opened position and the closed position. The cover actuator comprises a four-bar linkage operatively coupled to the cover at a first attachment point and a second attachment point.

The above and other features will become apparent from the following description and accompanying drawings.

BRIEF DESCRIPTION OF THE DRAWINGS

The detailed description of the drawings refers to the accompanying figures in which.

DETAILED DESCRIPTION

Figure 1:
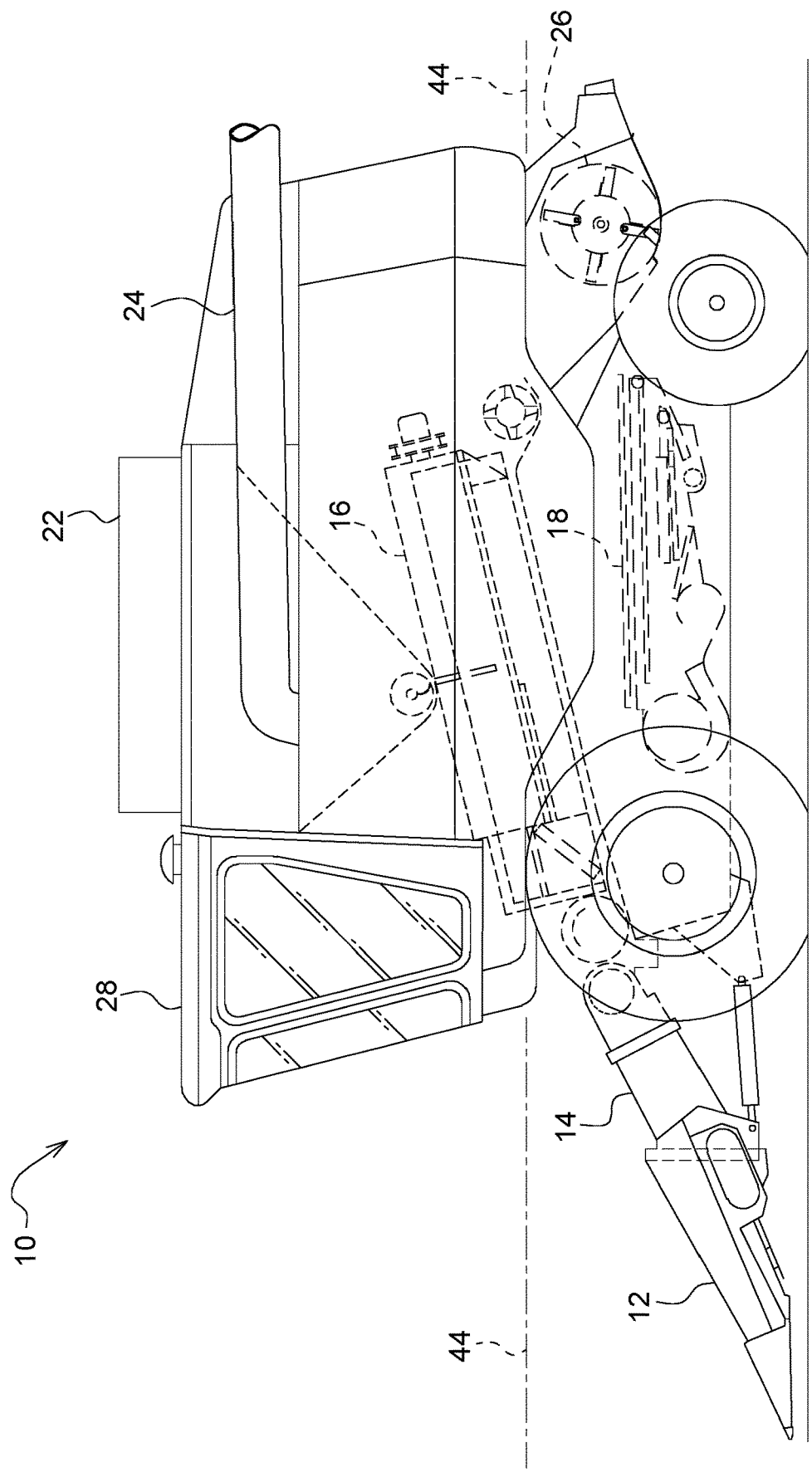
FIG. 1 is a side elevational view showing an agricultural combine harvester.

Referring to FIG. 1, an agricultural combine harvester 10 is configured to move in a forward or harvest direction of travel over a field to harvest crop from the field. The harvester 10 processes the crop, separating grain from residual crop material known as material other than grain or MOG (e.g., straw, stalks, cobs, leaves, chaff).

In general, the harvester 10 may include front-end equipment 12 to cut, gather, and transport crop rearwardly (some front-end equipment 12 may not cut crop, as in the case of a belt pick-up unit), a feederhouse 14 to advance crop received from the equipment 12 into the body of the harvester 10, a threshing and separating assembly 16 to thresh crop and separate grain from crop residue, a cleaning assembly 18 (which may be referred to as a cleaning shoe) including one more chaffers and sieves to separate grain from chaff or other relatively small pieces of crop material, a clean grain elevator (not shown) to elevate clean grain to a storage bin 22, an unloader 24 (with portions broken away) to unload clean grain from the storage bin 22 to another location, and a residue system 26 to process and distribute crop residue back onto the field. A person can control the harvester 10 from an operator's station 28 of the harvester 10. The harvester 10 may be configured in a wide variety of ways.

Figure 2:
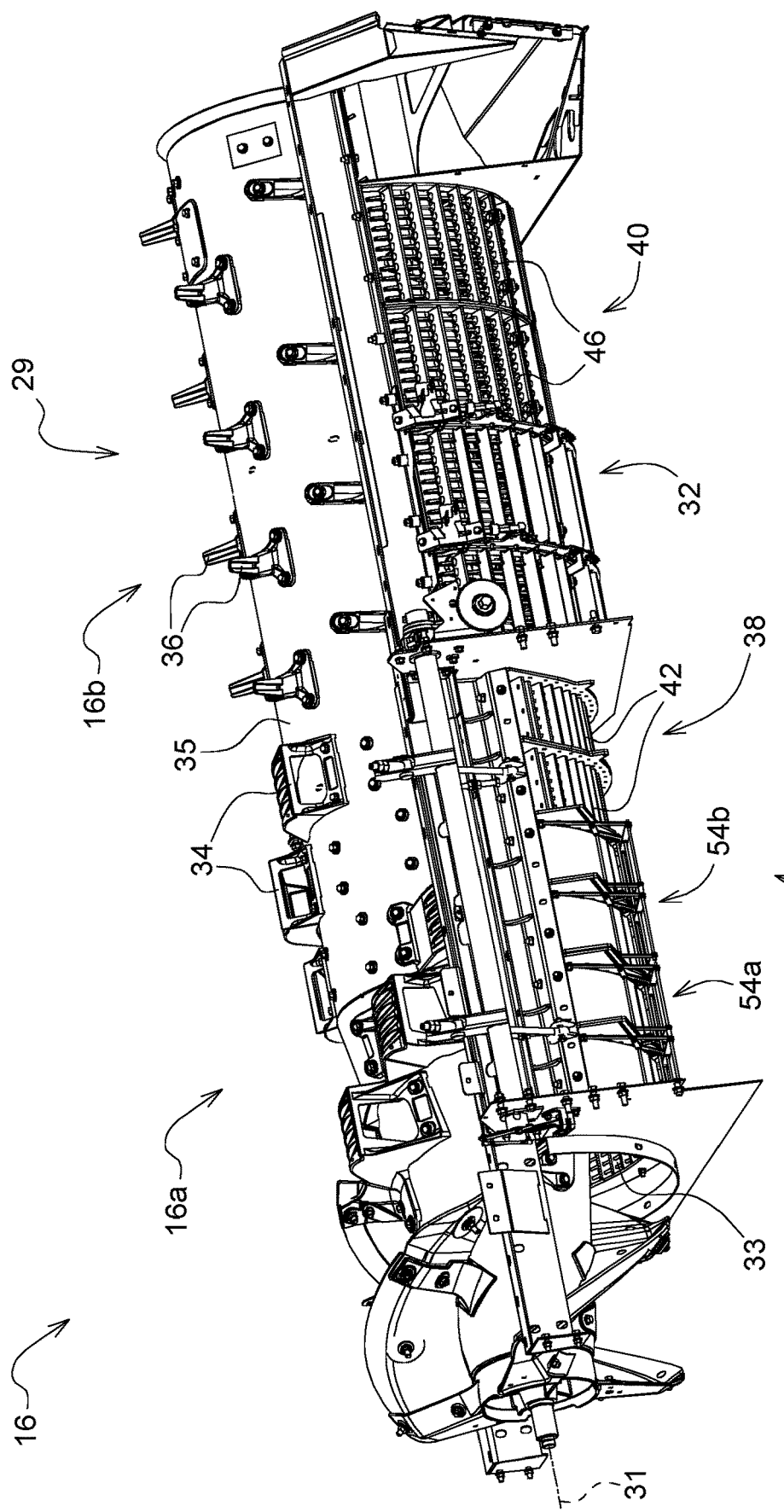
FIG. 2 is a perspective view showing a threshing and separating assembly of the combine harvester, the threshing and separating assembly including a rotor and a concave assembly underlying and extending about the rotor.
Figure 3:
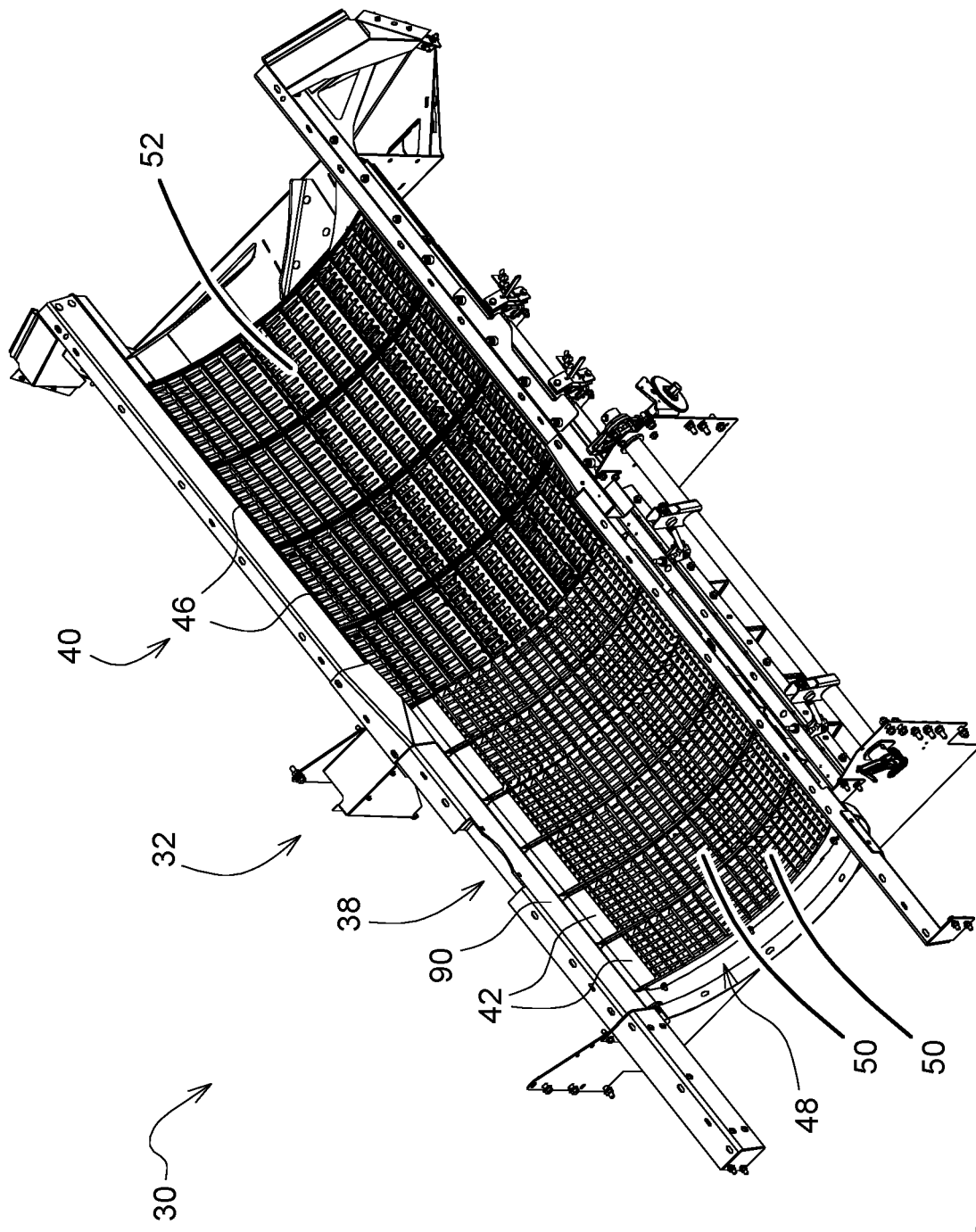
FIG. 3 is a perspective view showing the concave assembly.

Referring to FIGS. 2 and 3, the threshing and separating assembly 16 may be configured in a wide variety of ways. In an example, the threshing and separating assembly 16 includes an axial rotor 29 and a concave assembly 30. The rotor 29 and the concave assembly 30 cooperate to provide the assembly 16 with a threshing zone 16a for threshing grain and a separating zone 16b for separating threshed grain from residual crop material. In some examples, the threshing and separating assembly 16 includes a second rotor 29 (not shown) and a second concave assembly 30 (not shown), which cooperate to provide the assembly 16 with a second threshing zone 16a and a second separating zone 16b. In such a case, the rotors 29 are similar to one another in structure and function, and the concave assemblies 32 are similar to one another in structure and function.

The rotor 29 is configured to rotate about a rotor axis 31. The rotor 29 includes a rotatable cylinder 35, threshing elements 34, and separating elements 36. The threshing elements 34 are mounted to the exterior of the cylinder 35 in the threshing zone 16a, and the separating elements 36 are mounted to the exterior of the cylinder 35 in the separating zone 16b.

The concave assembly 30 includes a concave 32 underlying the rotor 29 to allow grain and smaller pieces of residual crop material to pass therethrough to the cleaning assembly 18. The rotor 29 is positioned in a threshing/separating chamber 33 defined in part by the concave 32.

The concave 32 includes a threshing concave 38 in the threshing zone 16a and a separating concave 40 in the separating zone 16b. The threshing elements 34 and the threshing concave 38 cooperate to thresh grain upon rotation of the rotor 29, and the separating elements 36 and the separating concave 40 cooperate to separate threshed grain from residual crop material.

Each of the threshing concave 38 and the separating concave 40 may include a plurality of sections. For example, the threshing concave 38 includes a plurality of threshing concave sections 42 (e.g., six sections), which are arranged in sequence with one another relative to a fore-aft axis 44 of the combine harvester 10, and the separating concave 40 includes a plurality of separating concave sections 46 (e.g., four sections), which are arranged aft of the threshing concave sections 42 and in sequence with one another relative to the fore-aft axis 44.

The concave 32 includes a grate 48 to allow grain and smaller pieces of residual crop material (material other than grain) to pass through the concave 32 to the cleaning assembly 18. The pattern of the grate 48 in the threshing concave 38 and the pattern of the grate 48 in the separating concave 40 may be different from one another. Each of the threshing concave sections 42 includes its own grate 50, with the grates 50 cooperating to provide the threshing concave grate pattern of the grate 48. Each of the separating concave sections 46 includes its own grate 52, with the grates 52 cooperating to provide the separating concave grate pattern of the grate 48.

Figure 4:
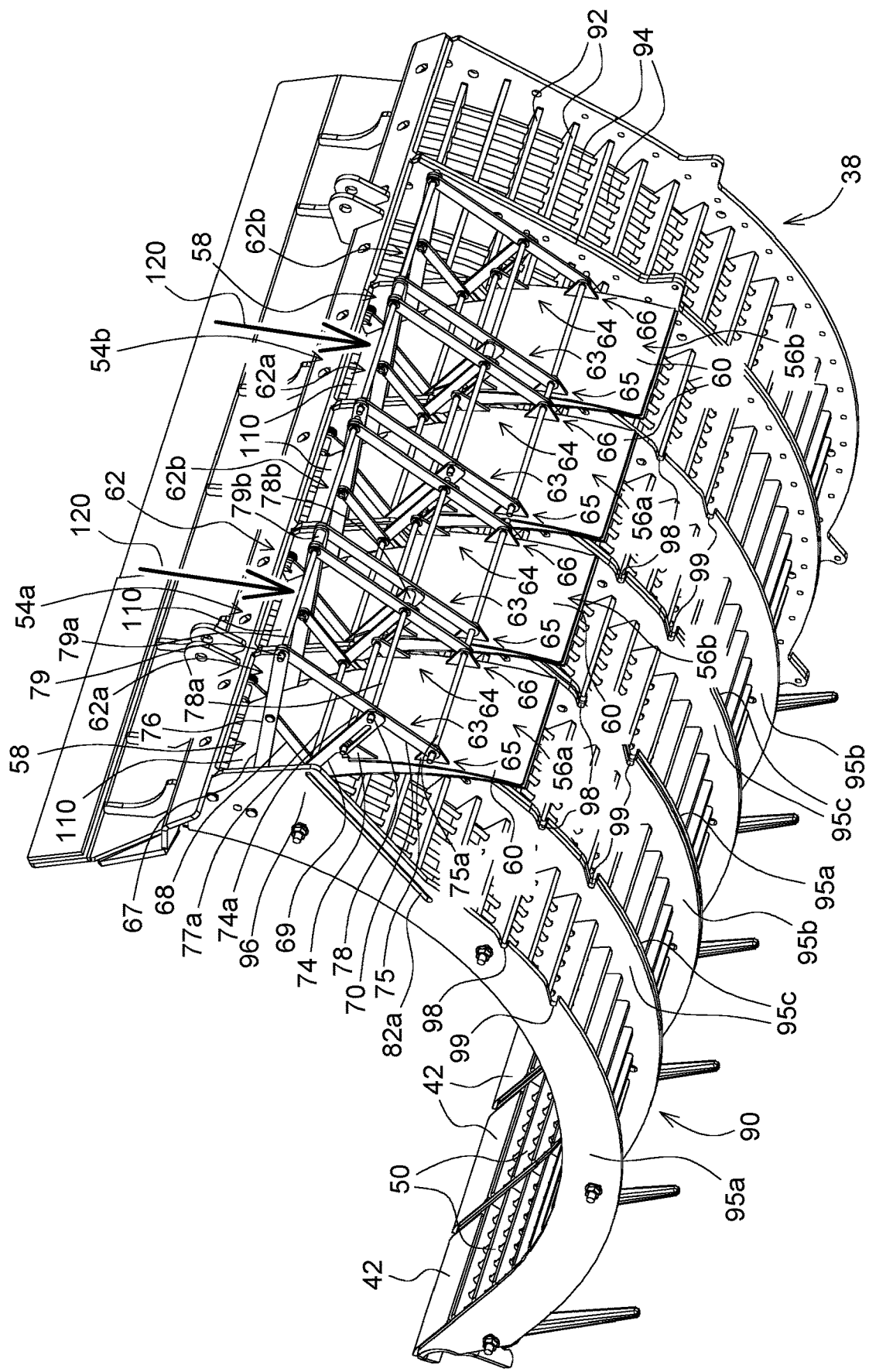
FIG. 4 is a perspective view showing a pair of cover mechanisms for use with a threshing concave of the concave assembly, each cover mechanism including a pair of cover assemblies and a cover actuator positioning the cover assemblies in an opened position uncovering a portion of the grate of the threshing concave to allow crop flow therethrough, each cover assembly associated with a respective threshing concave section of the threshing concave, the cover actuator including a four-bar linkage.
Figure 5:
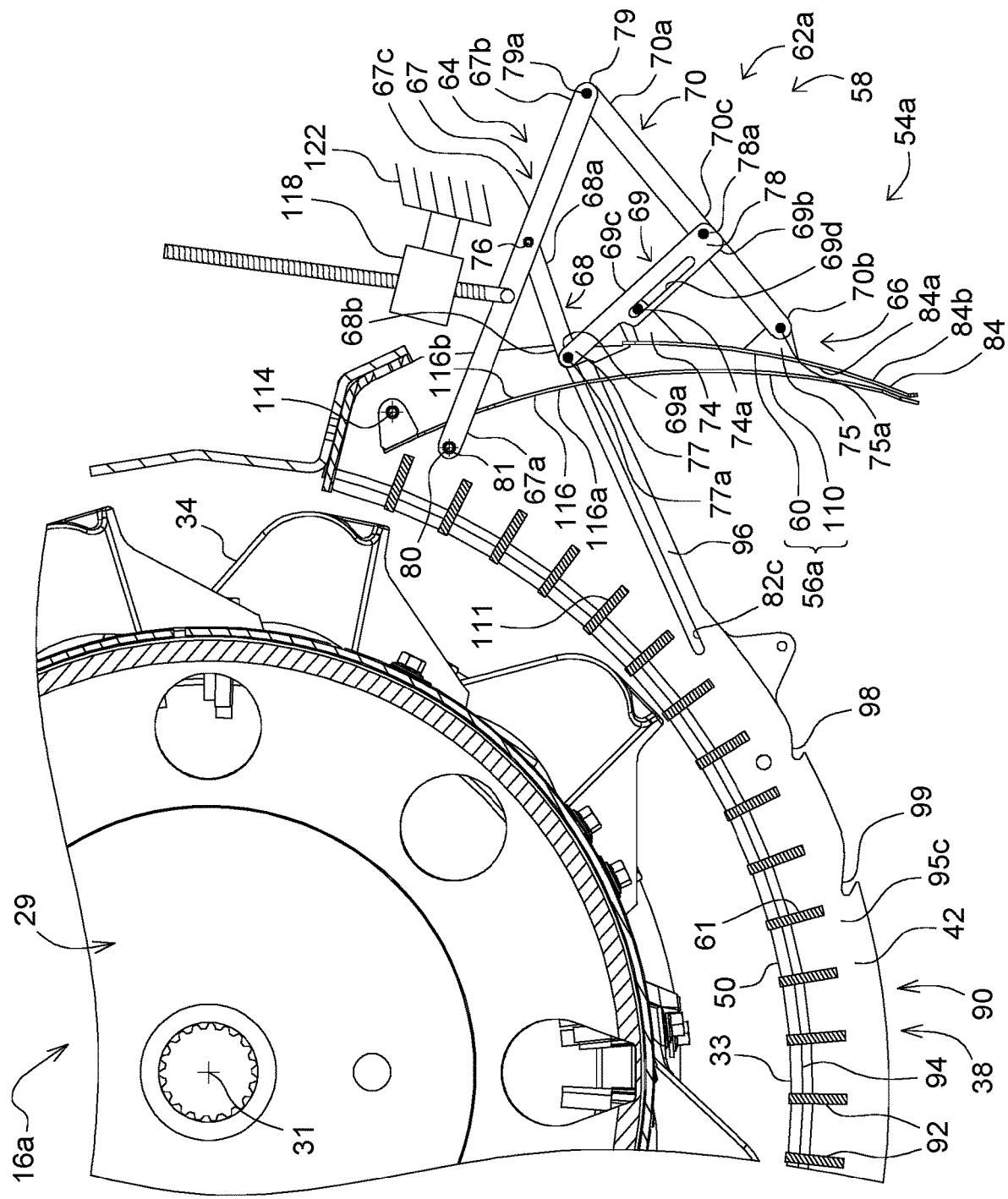
FIG. 5 is a front axial view of the concave assembly, with portions broken away, showing a front cover actuator positioning a cover assembly in the opened position.
Figure 6:
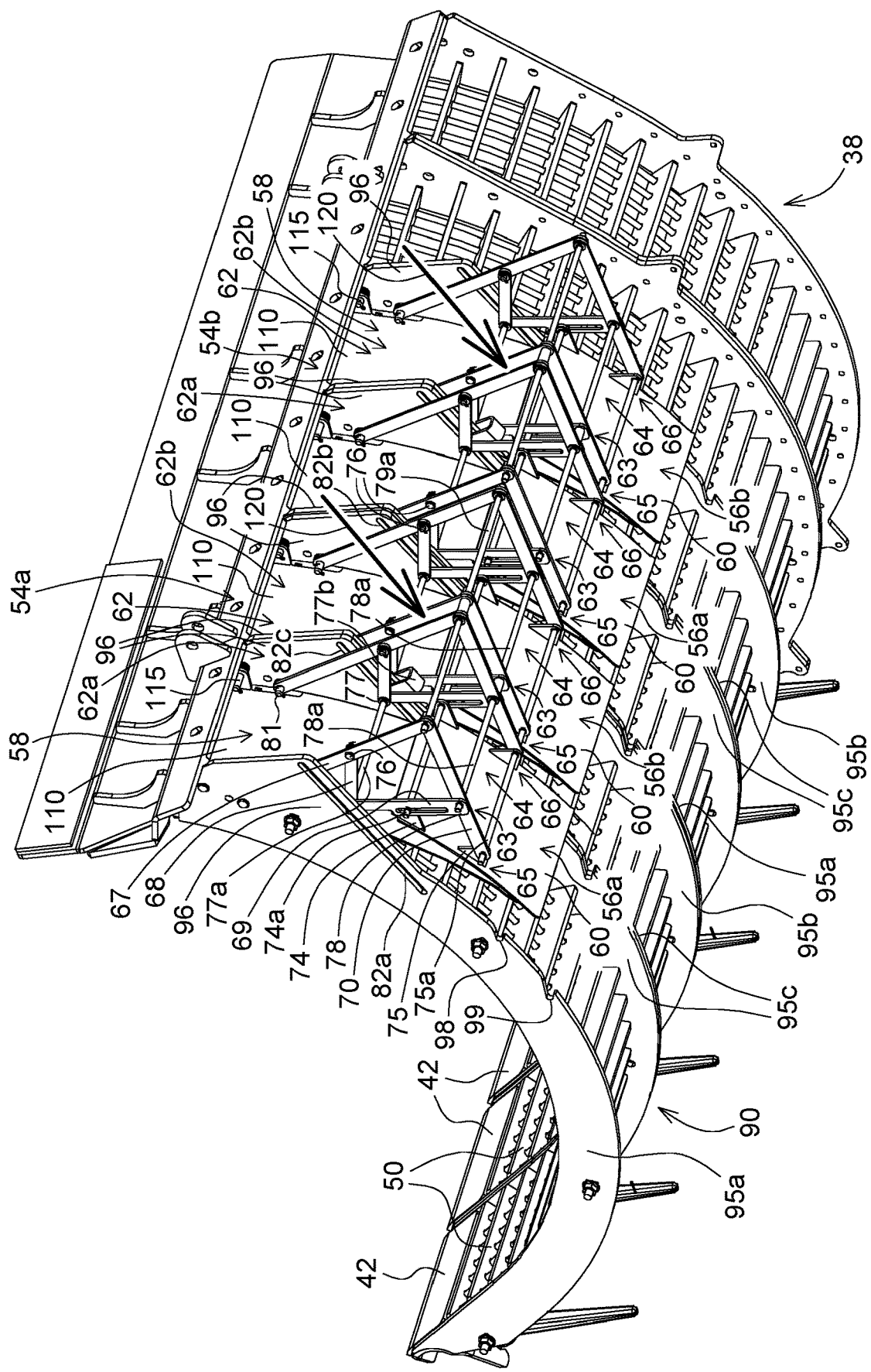
FIG. 6 is a perspective view showing the cover actuator of each cover mechanism moving the respective cover assemblies between the opened position and a closed position with the cover assemblies in a transition position between the opened and closed positions.
Figure 7:
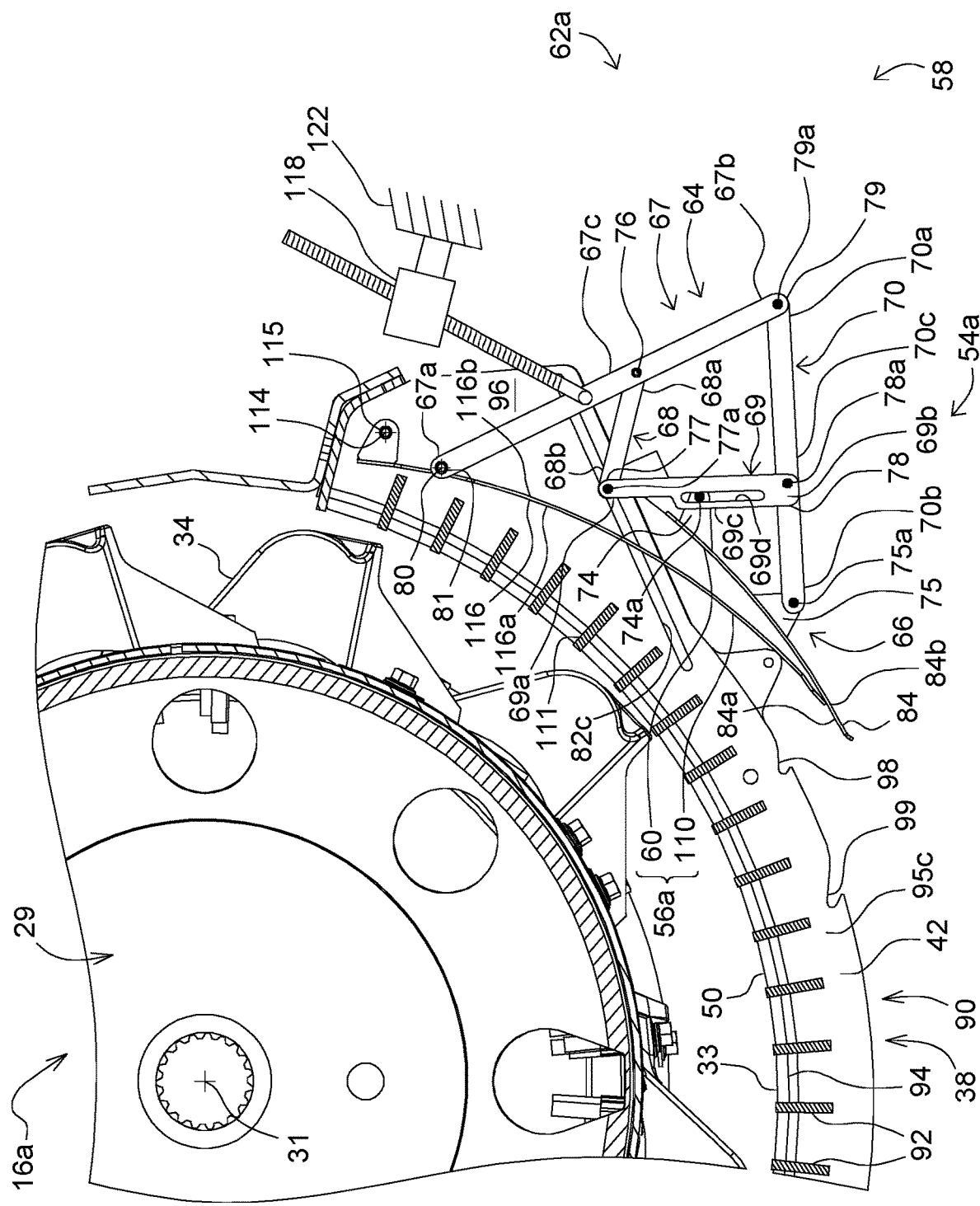
FIG. 7 is a front axial view of the concave assembly, with portions broken away, showing the front cover actuator positioning a cover assembly in the transition position.

Referring to FIG. 4, the threshing concave 38 includes a support frame 90, bars 92 parallel to one another, and rods 94 parallel to one another and perpendicular to the bars 92. The support frame 90 includes generally parallel frame members 95 extending angularly about the rotor axis 31 and spaced axially from one another relative to the rotor axis 31. Each frame member 95 is configured, for example, as a plate. One or more frame members 95 sub-divide the threshing concave 38 into the threshing concave sections 42. The bars 92 extend axially relative to the rotor axis 31 and are supported by the frame members 95. The rods 94 extend through the bars 92 and angularly about the rotor axis 31. The frame members 95 sub-divide the threshing concave 38 into the threshing concave sections 42, with the bars 92 and rods 94 cooperating to provide the grate 50 of each threshing concave section 42. The grate 50 is thereby coupled to the support frame 90.

The separating concave 40 similarly includes a support frame and parallel bars, but includes parallel fingers instead of rods. The support frame includes generally parallel frame members extending angularly about the rotor axis 31 and spaced axially from one another relative to the rotor axis 31. The bars extend axially relative to the rotor axis 31 and are supported by the frame members. The fingers are mounted to respective bars and extend angularly about the rotor axis 31. The frame members sub-divide the separating concave 40 into the separating concave sections 46, with the bars and fingers cooperating to provide the grate 52 of each separating concave section 46. The grate 52 is thereby coupled to the support frame 90.

Each grate 50, 52 can be uncovered or covered, for example, in whole or in part. Crop material can fall through the grate 50, 52 to the cleaning assembly 18 when the grate 50, 52 is uncovered. Crop material is blocked from passing through the grate 50, 52 when the grate 50, 52 is covered, for continued threshing and/or separating, depending on which grates 50, 52 are covered.

Referring to FIGS. 4-11, the concave assembly 30 includes one or more cover mechanisms 54 that cover and uncover the grate 50 of one or more threshing concave sections 42 and/or the grate 52 of one or more separating concave sections 46. In the illustrated example, the concave assembly 30 includes a pair of cover mechanism 54 each of which covers and uncovers the grate 50 of a pair of adjacent threshing concave sections 42. The pair of cover mechanisms 54 includes a front cover mechanism 54a and a rear cover mechanism 54b. The cover mechanism for a pair of adjacent separating concave sections 46 may be similar to the cover mechanism 54, with modifications as needed (e.g., possibly in dimensions and size of components).

Each cover mechanism 54 is associated with a number of frame members 95. Each cover mechanism 54 is associated with a front frame member 95a, a rear frame member 95b, and a pair of intermediate frame members 95c positioned between the front and rear frame members 95a, 95b and flush against one another in face-to-face relation (the "intermediate double frame member unit"). The rear frame member 95b associated with the front cover mechanism 54a and the front frame member 95a of the rear cover mechanism 54b are spaced apart slightly from one another. Each of the frame members 95a, 95b, 95c has a flange 96 extending away from the grate 48, the flanges 96 provided to support the cover mechanisms 54.

Each cover mechanism 54 includes a pair of cover assemblies 56 and a cover actuator 58 for moving the cover assemblies 56. The pair of cover assemblies 56 includes a front cover assembly 56a and a rear cover assembly 56b. Each cover assembly 56 is associated with a respective threshing concave section 42. The cover actuator 58 is operable to move the cover assemblies 56 together such that each cover assembly 56 covers and uncovers a portion of the grate 50 of the respective threshing concave section 42. The cover assemblies 56 and the cover actuator 58 are positioned outside the threshing/separating chamber 33 on an opposite side of the concave 32 from the rotor 29. It is to be appreciated that each cover assembly 56 may open and close independently, in which case there may be additional actuators to achieve such independent operation of each cover assembly 56. It is to be appreciated that the cover assemblies 56 may be used with respective separating concave sections 46.

Each cover assembly 56 is positioned between a pair of frame members 95. With respect to each cover mechanism 56, the front cover assembly 56a is positioned between a respective front frame member 95a and an intermediate frame member 95c of a respective intermediate double frame member unit, and the rear cover assembly 56b is positioned between the other intermediate frame member 95c of the that intermediate double frame member unit and a respective rear frame member 95b.

Each cover assembly 56 includes a first cover 60 and may include one or more other covers, for example, a second cover 110, as discussed in more detail herein. The first cover 60 has an opened position, shown, for example, in FIGS. 4 and 5, and a closed position, shown, for example, in FIGS. 8 and 9. A transition position between the opened and closed positions in shown, for example, in FIGS. 6 and 7. In the opened position, the cover 60 uncovers at least a portion 61 of the grate 50 to allow crop flow through the at least the portion 61 of the grate 50. In the closed position, the cover 60 covers the at least the portion 61 of the grate 50 to block crop flow through the at least the portion 61 of the grate 50.

Figure 8:
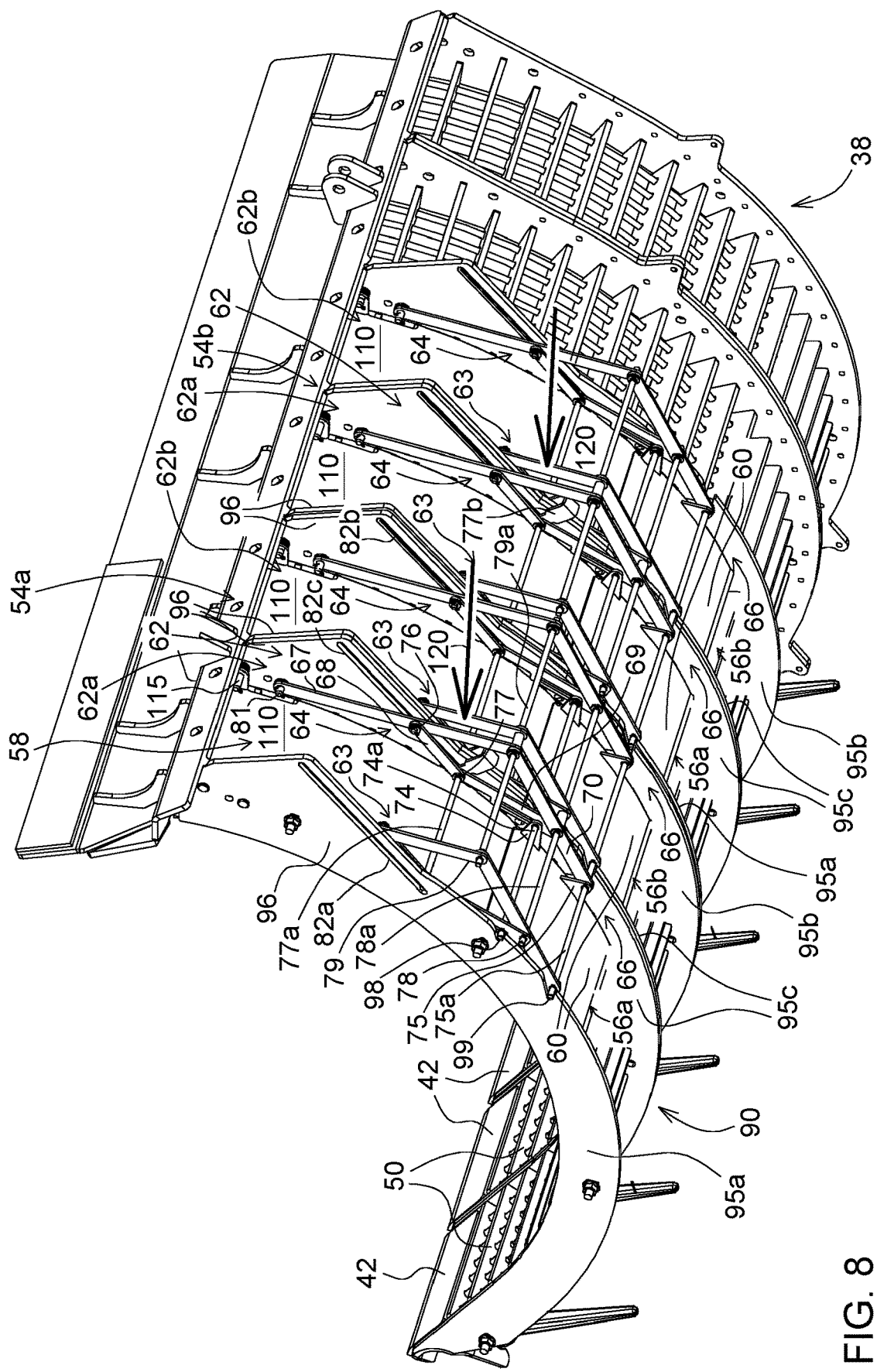
FIG. 8 is a perspective view showing the cover actuator of each cover mechanism positioning the respective cover assemblies in the closed position covering a portion of the grate of the threshing concave to block crop flow therethrough.
Figure 9:
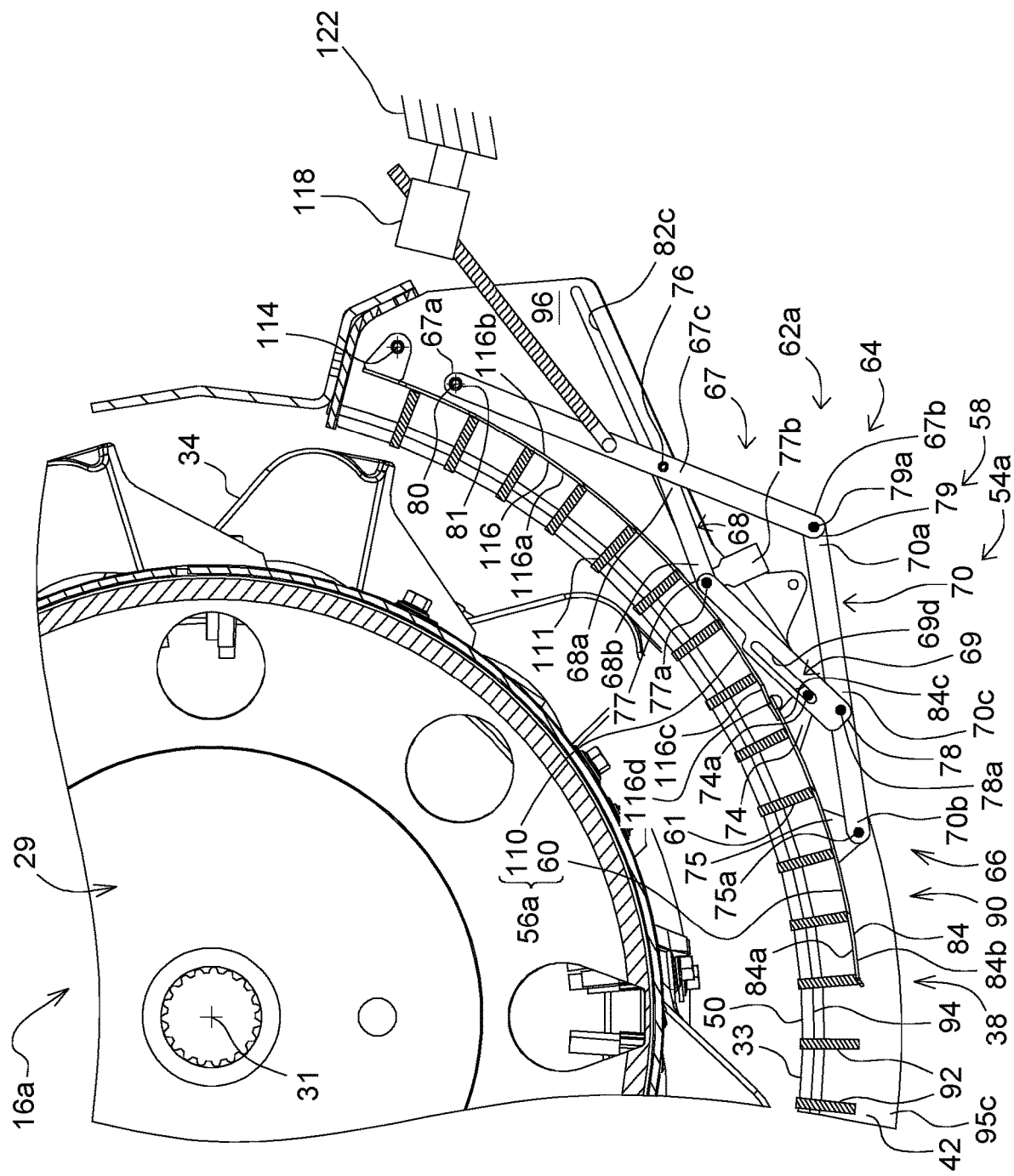
FIG. 9 is a front axial view of the concave assembly, with portions broken away, showing the front cover actuator positioning a cover assembly in the closed position.
Figure 10:
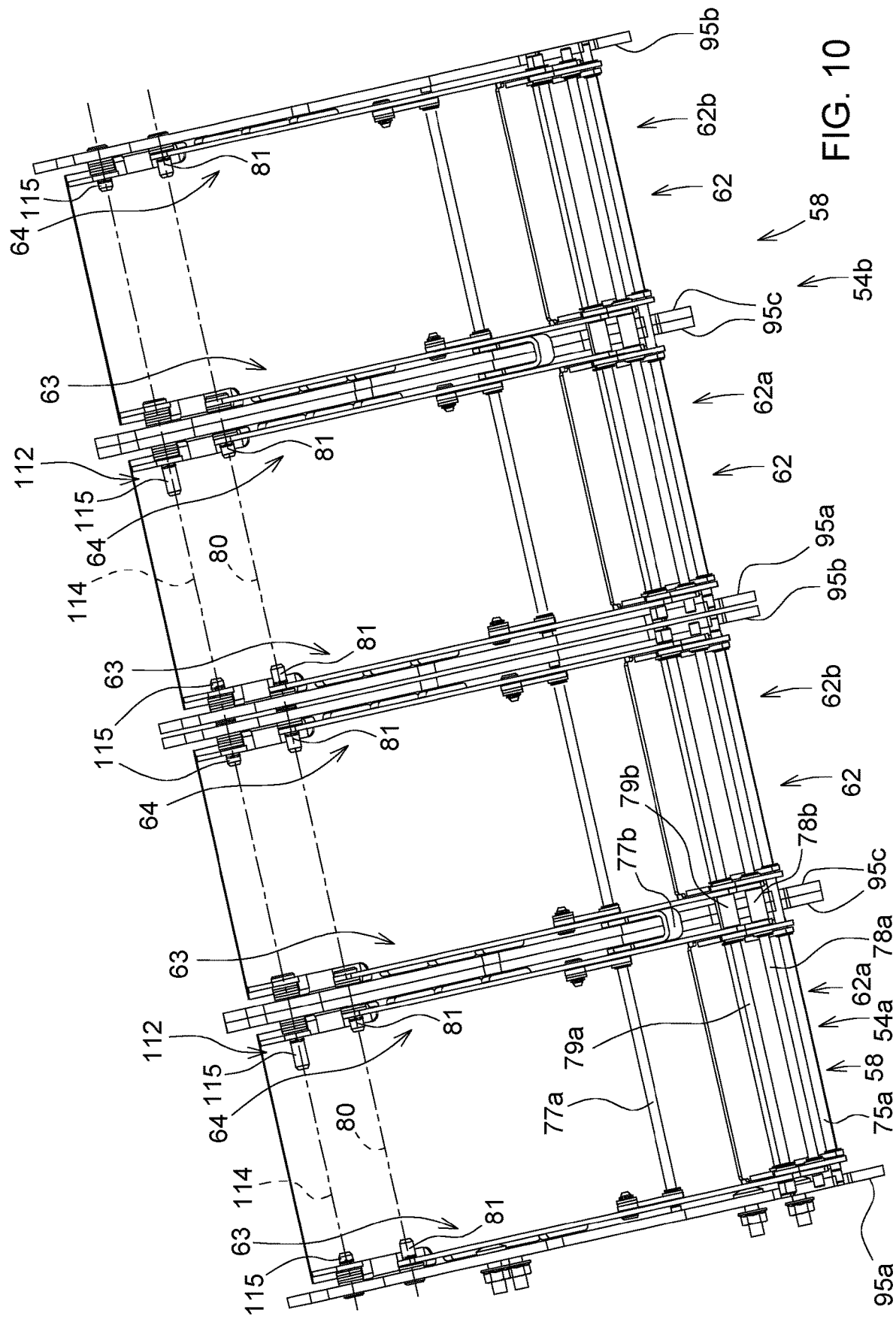
FIG. 10 is a side elevation view, with portions broken away, showing the cover assemblies positioned in the closed position.

The cover actuator 58 moves the covers 60 of the pair of cover assemblies 56 relative to the support frame 90 between the opened position (FIGS. 4 and 5) and the closed position (FIGS. 8 and 9). The cover actuator 58 includes a composite four-bar linkage 62 operatively coupled to the covers 60. The four-bar linkage 62 translates the covers 60 toward and away from the grate 50 between the opened position and the closed position. The four-bar linkage 62 facilitates movement of the covers 60 away from the grate 50 to minimize collection of material on the covers 60 when the covers 60 are in the opened position.

The four-bar linkage 62 includes a front linkage unit 62a coupled to the first cover 60 of the front cover assembly 56a and a rear linkage unit 62b coupled to the first cover 60 of the rear cover assembly 56b. Each of the front linkage unit 62a and the rear linkage unit 62b includes a first or front set of links 63, a second or rear set of links 64 coupled to the first set of links 63, a first or front set of attachment points 65 associated with the first set of links 63, and a second or rear set of attachment points 66 associated with the second set of links 64. Each set of links 63, 64 is itself configured as a four-bar linkage included in the composite four-bar linkage 62.

Each of the first and second sets of links 63, 64 includes a first link 67 (a pivot link), a second link 68 (a transmission link), a third link 69 (a slotted output link), and a fourth link 70 (an output link). Each of the first and second sets of attachment points 65, 66 comprises a first attachment point 74 and a second attachment point 75.

With respect to each of the first and second sets of links 63, 64 and the set of attachment points 65, 66 associated therewith, the first link 67 is pivotally mounted to the support frame 90 for pivotable movement relative thereto and against translation relative thereto. Each of the first link 67 and the third link 69 is pivotally coupled to the second link 68 and the fourth link 70 such that the first link 67 and the third link 69 are opposite one another in the four-bar linkage 62 and the second link 68 and the fourth link 70 are opposite one another in the four-bar linkage 62. The third link 69 is pivotally coupled to the first attachment point 74 of the first cover 60. The fourth link 70 is pivotally coupled to the second attachment point 75 of the first cover 60. As such, the four-bar linkage 62 is operatively coupled to the cover 60 at the first attachment point 74 of each set of attachment points 65, 66 and the second attachment point 75 of each set of attachment points 65, 66.

Each of the links 67, 68, 69, 70 is configured, for example, as a linear member. The first link 67 includes a first end portion 67a, an opposite second end portion 67b, and an intermediate portion 67c positioned between the first end portion 67a and the second end portion 67b. The second link 68 includes a first end portion 68a and an opposite second end portion 68b. The third link 69 includes a first end portion 69a, an opposite second end portion 69b, and an intermediate portion 69c positioned between the first end portion 69a and the second end portion 69b. The fourth link 70 includes a first end portion 70a, an opposite second end portion 70b, and an intermediate portion 70c positioned between the first end portion 70a and the second end portion 70b.

The links 67, 68, 69, 70 are interconnected via pivot joints. The intermediate portion 67c of the first link 67 and the first end portion 68a of the second link 68 are pivotally coupled to one another via a first pivot joint 76 of the linkage 62. The second end portion 68b of the second link 68 and the first end portion 69a of the third link 69 are pivotally coupled to one another via a second pivot joint 77 of the linkage 62. The second end portion 69b of the third link 69 and the intermediate portion 70c of the fourth link 70 are pivotally coupled to one another via a third pivot joint 78 of the linkage 62. The first end portion 70a of the fourth link 70 and the second end portion 67b of the first link 67 are pivotally coupled to one another via a fourth pivot joint 79 of the linkage 62.

With respect to each cover mechanism 54, the first links 67 are mounted to the support frame 90 for pivotable movement about a pivot axis 80 relative to the support frame 90 and the concave 32 and against translation relative to the support frame 90 and the concave 32. The front first link 67 of the front linkage unit 62a is pivotally mounted to the front frame member 95a via a pivot pin 81 extending through the first end portion 67a of the front first link 67, the flange 96 of the front frame member 95a, and a suitable number of spacers (e.g., washers) positioned between the first end portion 67a and the flange 96, with a cotter pin to retain the pivot pin 81 in place. The rear first link 67 of the rear linkage unit 62b is pivotally mounted to the rear frame member 95b via a pivot pin 81 extending through the first end portion 67a of the rear first link 67, the flange 96 of the rear frame member 95b, and a suitable number of spacers (e.g., washers) positioned between the first end portion 67a and the flange 96, with a cotter pin to retain the pivot pin 81 in place. The rear first link 67 of the front linkage unit 62a and the front first link 67 of the rear linkage unit 62b are pivotally mounted to the two intermediate frame members 95c of the respective intermediate double frame member unit via a longer pivot pin 81 extending through the first end portions 67a of those two first links 67, the flanges 96 of those two intermediate frame members 95, and a suitable number of spacers (e.g., washers) positioned between the first end portion 67a of the rear first link 67 and the front intermediate frame member 95c and a suitable number of spacers (e.g., washers) positioned between the first end portion 67a of the front first link 67 and the rear intermediate frame member 95c, with a cotter pin to retain the pivot pin 81 in place. The pivot pins 81 cooperate to define the pivot axis 80 for the first links 67.

Each first pivot joint 76 of each cover mechanism 54 has its own pivot pin that extends through the intermediate portion 67c of the first link 67 and the first end portion 68a of the second link 68, with a cotter pin to retain the pivot pin in place. A suitable number of spacers (e.g., washers) are positioned on the pivot pin between the first end portion 68a of the second link 68 and the cotter pin.

The support frame 90 includes three tracks 82a, 82b, 82c for each cover mechanism 54. The tracks 82a, 82b, 82c are included in frame members 95a, 95b, 95c. The front track 82a is included in the flange 96 of the front frame member 95a so as to extend therethrough (front frame member 95a associated with the front cover mechanism 54a is removed in FIGS. 5, 7, and 9). The rear track 82b is included in the flange 96 of the rear frame member 95b so as to extend therethrough. The intermediate track 82c is included in the flanges 96 of the two intermediate frame members 95c so as to extend therethrough.

The four second pivot joints 74 of each cover mechanism 54 are coupled to the tracks 82. Each second pivot joint 74 is coupled to a track 82 to follow the track 82 when the first cover 60 moves between the opened position and the closed position. The second pivot joint 74 is slidably coupled to the track 82 to slidably translate along the track 82 when the cover 60 moves between the opened and closed positions. The track 82 is linear such that the second pivot joint 74 translates in a linear manner back-and-forth along the track 82. The front pivot joint 74 of the front linkage unit 62a is coupled to the track 82a. The rear pivot joint 74 of the rear linkage unit 62b is coupled to the track 82b. The rear pivot joint 74 of the front linkage unit 62a and the front pivot joint 74 of the rear linkage unit 62b are coupled to the track 82c.

The second pivot joints 77 of each cover mechanism 54 are interconnected for movement together between the opened and closed positions. The second pivot joints 77 share an elongated pivot pin or rod 77a which extends through the second end portion 68b of each second link 68 and the first end portion 69a of each third link 69. The pivot pin 77a extends into the front and rear tracks 82a, 82b and through the intermediate track 82b so as to be received in the tracks 82a, 82b, 82c. The pin 77a is slidably coupled to the track 82 so as to slide therein. Each track 82a, 82b, 82c is configured, for example, as a slot into which the pin 77a extends.

The second and third links 68, 69 are retained on the pivot pin 77a. With respect to the front second pivot joint 77 of the front linkage unit 62a and the rear second pivot joint 77 of the rear linkage unit 62b, the second end portion 68b of the second link 68 and the first end portion 69a of the third link 69 are positioned on the pivot pin 77a between two axially-spaced retaining rings (e.g., circlips) received in respective annular grooves formed in the pivot pin 77a, with a suitable number of spacers (e.g., washers) positioned between the second end portion 68b of the second link 68 and the rear retaining ring of the front second pivot joint 77 of the front linkage unit 62a and with a suitable number of spacers (e.g., washers) positioned between the second end portion 68b of the second link 68 and the front retaining ring of rear second pivot joint 77 of the rear linkage unit 62b.

With respect to the rear second pivot joint 77 of the front linkage unit 62a and the front second pivot joint 77 of the rear linkage unit 62b, the second end portion 68b of the second link 68 and the first end portion 69a of the third link 69 are positioned on the pivot pin 77a between a retaining ring (e.g., circlip) positioned at the front of the rear second pivot joint 77 of the front linkage unit 62a in a respective annular groove formed in the pivot pin 77a and a retaining ring (e.g., circlip) positioned at the rear of the front second pivot joint 77 of the rear linkage unit 62b in a respective annular grooved formed in the pivot pin 77a. A suitable number of spacers (e.g., washers) may be positioned between the front retaining ring and the second end portion 68b of the second link 68 of the rear second pivot joint 77 of the front linkage unit 62a, and a suitable number of spacers (e.g., washers) may be positioned between the rear retaining ring and the second end portion 68b of the second link 68 of the front second pivot joint 77 of the rear linkage unit 62b.

Figure 11:
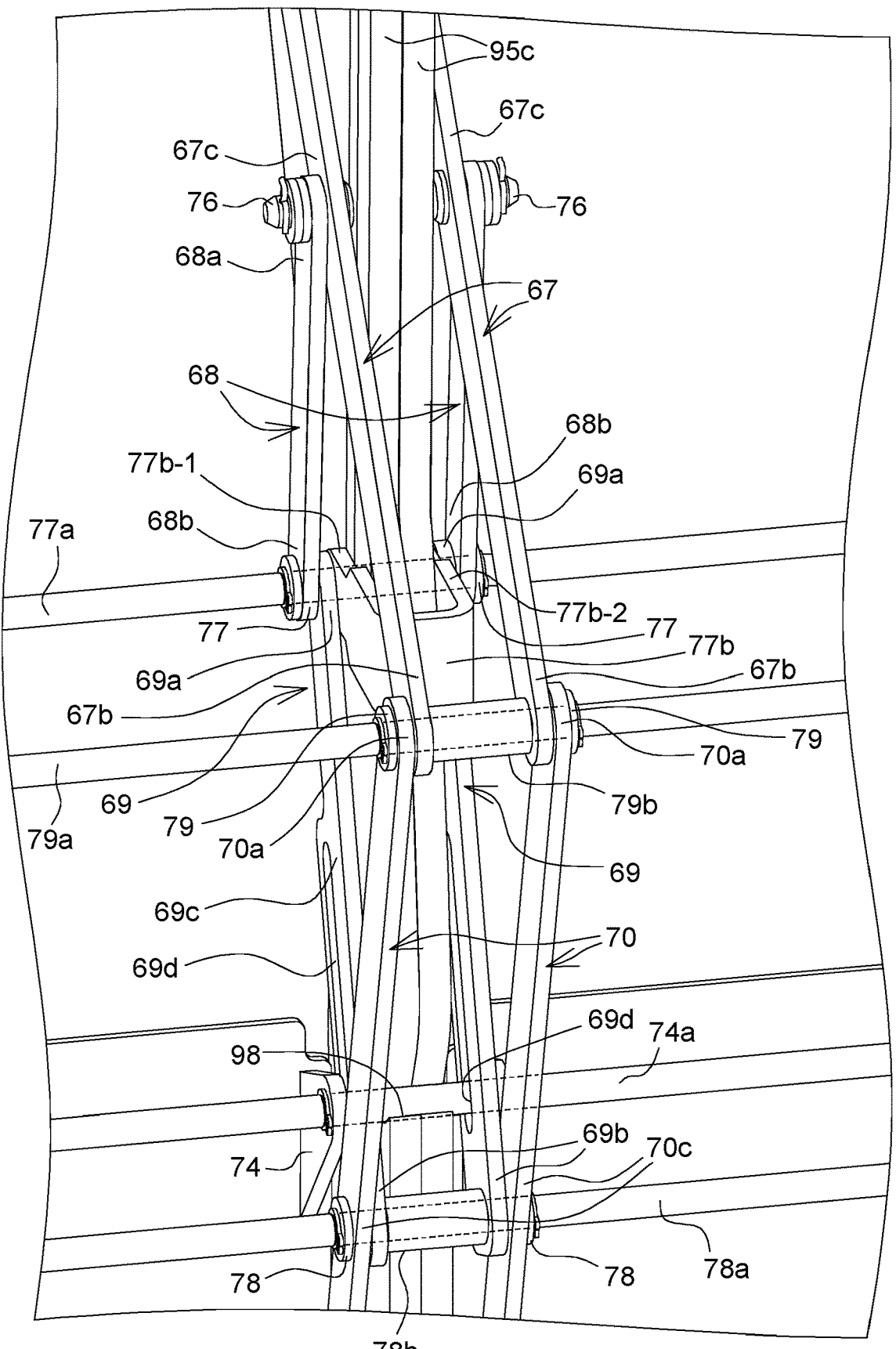
FIG. 11 is an enlarged perspective view showing a pair of pivot joints with a pivot pin extending through a track.

A U-shaped spacer 77b, shown, for example, in FIG. 11, extends around the flanges 96 of the two intermediate frame members 95c and includes a first leg 77b-1 and a second leg 77b-2. The pivot pin 77a extends through the first and second legs 77b-1, 77b-2. The first leg 77b-1 is positioned between the first end portion 69a of the third link 69 of the rear second pivot joint 77 of the first linkage unit 62a and flange 96 of the front intermediate frame member 95c. The second leg 77b-2 is positioned between the second portion 69a of the third link 69 of the front second pivot joint 77 of the second linkage unit 62b and the flange 96 of the rear intermediate frame member 95c.

The four third pivot joints 78 of each cover mechanism 54 are interconnected for movement together between the opened and closed positions. The third pivot joints 78 share an elongated pivot pin or rod 78a which extends through the second end portion 69b of each third link 69 and the intermediate portion 70c of each fourth link 70.

The third and fourth links 69, 70 are retained on the pivot pin 78a. With respect to the front third pivot joint 78 of the front linkage unit 62a and the rear third pivot joint 78 of the rear linkage unit 62b, the second end portion 69b of the third link 69 and the intermediate portion 70c of the fourth link 70 are positioned on the pivot pin 78a between two axially-spaced retaining rings (e.g., circlips) received in respective annular grooves formed in the pivot pin 78a, with a suitable number of spacers (e.g., washers) positioned between the intermediate portion 70c of the fourth link 70 and the rear retaining ring of the front third pivot joint 78 of the front linkage unit 62a and with a suitable number of spacers (e.g., washers) positioned between the intermediate portion 70c of the fourth link 70 and the front retaining ring of the rear third pivot joint 78 of the rear linkage unit 62b.

With respect to the rear third pivot joint 78 of the front linkage unit 62a and the front third pivot joint 78 of the rear linkage unit 62b, the second end portion 69b of the third link 69 and the intermediate portion 70c of the fourth link 70 are positioned on the pivot pin 78a between a retaining ring (e.g., circlip) positioned at the front of the rear third pivot joint 78 of the front linkage unit 62a in a respective annular groove formed in the pivot pin 78a and a retaining ring (e.g., circlip) positioned at the rear of the front third pivot joint 78 of the rear linkage unit 62b in a respective annular grooved formed in the pivot pin 78a. A suitable number of spacers (e.g., washers) may be positioned between the front retaining ring and the intermediate portion 70c of the fourth link 70 of the rear third pivot joint 78 of the front linkage unit 62a, and a suitable number of spacers (e.g., washers) may be positioned between the rear retaining ring and the intermediate portion 70c of the fourth link 70 of the front third pivot joint 78 of the rear linkage unit 62b.

The rear third pivot joint 78 of the front linkage unit 62a and the front third pivot joint 78 of the rear linkage unit 62b share a spacer 78b (e.g., barrel). The pivot pin 78a extends through the spacer 78b which separates the second end portion 69b of the third link 69 of the rear third pivot joint 78 of the front linkage unit 62a and the second end portion 69b of the third link 69 of the front third pivot joint 78 of the front linkage unit 62b.

The four fourth pivot joints 79 of each cover mechanism 54 are interconnected for movement together between the opened and closed positions. The fourth pivot joints 79 share an elongated pivot pin or rod 79a which extends through the first end portion 70a of each fourth link 70 and the second end portion 67b of each first link 67.

The first and fourth links 67, 70 are retained on the pivot pin 79a. With respect to the front fourth pivot joint 79 of the front linkage unit 62a and the rear fourth pivot joint 79 of the rear linkage unit 62b, the first end portion 70a of the fourth link 70 and the second end portion 67b of the first link 67 are positioned on the pivot pin 79a between two axially-spaced retaining rings (e.g., circlips) received in respective annular grooves formed in the pivot pin 79a, with a suitable number of spacers (e.g., washers) positioned between the first end portion 70a of the fourth link 70 and the rear retaining ring of the front fourth pivot joint 79 of the front linkage unit 62a and with a suitable number of spacers (e.g., washers) positioned between the first end portion 70a of the fourth link 70 and the front retaining ring of the rear fourth pivot joint 79 of the rear linkage unit 62b.

With respect to the rear fourth pivot joint 79 of the front linkage unit 62a and the front fourth pivot joint 79 of the rear linkage unit 62b, the first end portion 70a of the fourth link 70 and the second end portion 67b of the first link 67 are positioned on the pivot pin 79a between a retaining ring (e.g., circlip) positioned at the front of the rear fourth pivot joint 79 of the front linkage unit 62a in a respective annular groove formed in the pivot pin 79a and a retaining ring (e.g., circlip) positioned at the rear of the front fourth pivot joint 79 of the rear linkage unit 62b in a respective annular grooved formed in the pivot pin 79a. A suitable number of spacers (e.g., washers) may be positioned between the front retaining ring and the first end portion 70a of the fourth link 70 of the rear second pivot joint 79 of the front linkage unit 62a, and a suitable number of spacers (e.g., washers) may be positioned between the rear retaining ring and the first end portion 70a of the fourth link 70 of the front fourth pivot joint 79 of the rear linkage unit 62b.

The rear fourth pivot joint 79 of the front linkage unit 62a and the front fourth pivot joint 79 of the rear linkage unit 62b share a spacer 79b (e.g., barrel). The pivot pin 79a extends through the spacer 79b which separates the second end portion 67b of the first link 67 of the rear fourth pivot joint 79 of the front linkage unit 62a and the second end portion 67b of the first link 67 of the front third pivot joint 78 of the front linkage unit 62b.

With respect to each cover mechanism 54, the four third links 69 are coupled respectively to the four first attachment points 74. In each case, the intermediate portion 69c of the third link 69 is coupled to the first attachment point 74. The third link 69 includes a slot 69d, which is included in the intermediate portion 69c. The slot 69d extends lengthwise of the third link 69 between the first and second end portions 69a, 69b thereof. The first attachment point 74 and the slot 69d are coupled to one another for relative slidable movement therebetween when the first cover 60 moves between the opened position and the closed position. The first attachment point 74 is positioned closer to the third pivot joint 78 when the cover 60 is positioned in the closed position than when the cover 60 is positioned in the opened position.

The four first attachment points 74 are interconnected for movement together between the opened and closed positions. Each first attachment point 74 includes an ear having a hole therethrough, the ear mounted (e.g., welded) to the second surface 84b of the first plate 84 of the first cover 60. The first attachment points 74 share an elongated pin or rod 74a which extends through the holes of the ears of the first attachment points 74 and through the slots 69d of the four third links 69.

The pin 74a is retained relative to the third links 69 and the ears of the first attachment points 74. With respect to the front third link 69 and ear of the front attachment point 74 of the front linkage unit 62a and the rear third link 69 and ear of the rear attachment point 74 of the rear linkage unit 62b, the intermediate portion 69c of the third link 69 and the ear of the attachment point 74 are positioned on the pin 74a between two axially-spaced retaining rings (e.g., circlips) received in respective annular grooves formed in the pin 74a. A suitable number of spacers (e.g., washers) may be positioned between either retaining ring and the adjacent third link 69 or ear.

With respect to the rear third link 69 and ear of the rear attachment point 74 of the front linkage unit 62a and the front third link 69 and ear of the front attachment point 74 of the rear linkage unit 62b, a retaining ring (e.g., circlip) is positioned in front of the ear of the rear attachment point 74 of the front linkage unit 62a, and a retaining ring (e.g., circlip) is positioned to the rear of the ear of the front attachment point 74 of the rear linkage unit 62b. A suitable number of spacers (e.g., washers) may be positioned between either such retaining ring and the respective ear.

The pin 74a moves relative to notches 98 formed in the support frame 90. The flange 96 of each frame member 95a, 95b includes a notch 98, and the flanges 96 of the two intermediate frame members 95c cooperate to provide a thicker notch 98. The pin 74a nests in the notches 98 in the closed position and is positioned outside the notches 98 in the opened position.

With respect to each cover mechanism 54, the four fourth links 69 are pivotally coupled respectively to the four second attachment points 75 interconnected for movement together between the opened and closed positions. In each case, the second end portion 70b of the fourth link 70 is pivotally coupled to the second attachment point 75. Each second attachment point 75 includes an ear having a hole therethrough, the ear mounted (e.g., welded) to the second surface 84b of the first plate 84 of the first cover 60. The second attachment points 75 share an elongated pin or rod 75a which extends through the holes of the ears of the second attachment points 75.

The pin 75a is retained relative to the fourth links 70 and the ears of the second attachment points 75. With respect to the front fourth link 70 and ear of the front attachment point 75 of the front linkage unit 62a and the rear fourth link 70 and ear of the rear attachment point 75 of the rear linkage unit 62b, the second end portion 70b of the fourth link 70 and the ear of the attachment point 75 are positioned on the pin 75a between two axially-spaced retaining rings (e.g., circlips) received in respective annular grooves formed in the pin 75a. A suitable number of spacers (e.g., washers) may be positioned between either retaining ring and the adjacent fourth link 70 or ear.

With respect to the rear fourth link 70 and ear of the rear attachment point 75 of the front linkage unit 62a and the front fourth link 70 and ear of the front attachment point 75 of the rear linkage unit 62b, a retaining ring (e.g., circlip) is positioned in front of the ear of the rear attachment point 75 of the front linkage unit 62a, and a retaining ring (e.g., circlip) is positioned to the rear of the ear of the front attachment point 75 of the rear linkage unit 62b. A suitable number of spacers (e.g., washers) may be positioned between either such retaining ring and the respective ear.

The pin 75a moves relative to notches 99 formed in the support frame 90. The flange 96 of each frame member 95a, 95b includes a notch 99, and the flanges 96 of the two intermediate frame members 95c cooperate to provide a thicker notch 99. The pin 75a nests in the notches 99 in the closed position and is positioned outside the notches 99 in the opened position.

The first cover 60 includes a first plate 84. In the opened position, the plate 84 is spaced apart from concave bars 92 of the threshing concave section 42 through which concave rods 94 of the concave section 42 extend transversely thereto, such that the plate 84 uncovers the at least the portion 61 of the grate 50 to allow crop flow through the at least the portion 61 of the grate 50. In the closed position, the plate 84 contacts concave bars 92, such that the plate 84 covers the at least the portion 61 of the grate 50 to block crop flow through the at least the portion 61 of the grate 50. The plate 84 is configured, for example, as a curved plate shaped to match the curvature of the threshing concave 38.

The plate 84 includes a first surface 84a and a second surface 84b. The first surface 84a contacts the concave bars 92 in the closed position and is spaced apart from the concave bars 92 in the opened position. The first and second surfaces 84a, 84b face in opposite directions.

The first and second attachment points 74, 75 of each set of attachment points 65, 66 are positioned along a respective side edge of the cover 60. The attachment points 74, 75 of the first set of attachment points 65 are positioned along a first side edge of the plate 84 in spaced apart relation to one another, and the attachment points 74, 75 of the second set of attachment points 66 are positioned along an opposite second side edge of the plate 84 in spaced apart relation to one another. The attachment points 74, 75 are mounted to the second surface 84b of the plate 84 in fixed relation thereto (e.g., welded).

Each cover assembly 56 may include one or more additional covers. For example, the cover assembly 56 includes a second cover 110. The second cover 110 is movable relative to the support frame 90 between an opened position and a closed position. In the opened position of the second cover 110, the second cover 110 uncovers at least a second portion 111 of the grate 50 to allow crop flow through the at least the second portion 111 of the grate 50. In the closed position of the second cover 110, the second cover 110 covers at least the second portion 111 of the grate 50 to block crop flow through the at least the second portion 111 of the grate 50.

The second cover 110 is pivotally mounted to the support frame 90 via a pivot mount 112 of the second cover 110 for pivotable movement about a pivot axis 114, which is separate from and parallel to the pivot axis 80. The second cover 110 is suspended from the pivot mount 112 so as to be pivotable about the pivot axis 114 between its opened and closed positions. The second cover 110 is positioned at least partially between the first cover 60 and the grate 50 such that movement of the first cover 60 by the four-bar linkage 62 from the opened position of the first cover 60 to the closed position of the first cover 60 urges the second cover 110 from the opened position of the second cover 110 to the closed position of the second cover 110. Gravity urges the second cover 110 from its closed position to its opened position when the first cover 60 is moved from its closed position to its opened position by the linkage 62. Crop pressure can also force the second cover 110 open.

The first cover 60 shingles the second cover 110 into contact with the concave 32 when the first cover 60 is positioned in its closed position and the second cover 110 is positioned in its closed position. The first cover 60 partially overlaps the second cover 110 when the covers 60, 110 are positioned in their closed positions.

The second cover 110 includes a second plate 116. The second plate 116 includes a first surface 116a and a second surface 116b. The first surface 116a contacts the concave bars 92 in the closed position of the second cover 110 and is spaced apart from the concave bars 92 in the opened position of the second cover 110. The first and second surfaces 116a, 116b face in opposite directions. The second plate 116 is configured, for example, as a curved plate shaped to match the curvature of the threshing concave 38.

The first cover 60 contacts the second cover 110 when they are positioned in their closed positions. The first surface 84a of the first plate 84 contacts the second surface 116b of the second cover 110 when the first and second covers 60, 110 are positioned in their closed positions. The second cover 110 includes a jog 116d in a distal end portion 116c of the plate 116 of the second cover 110, and the first cover 60 includes an end portion 116c of the first plate 84. When the first and second covers 60, 110 are positioned in their closed positions (FIG. 9), the end portion 116c nests in the jog 116d, and the jog 116d is positioned between a pair of adjacent concave bars 92. The first cover 60 may continue to contact the second cover 110 when they are positioned in their opened positions. In some embodiments, the first cover 60 may withdraw from contact with the second cover 110 so as to become spaced apart therefrom when they are positioned in their opened positions. In such a case, the second cover 110 may dangle from its pivot mount 112 under the influence of gravity.

The pivot mount 112 of each second cover 110 includes a pair of ears. The ears are mounted (e.g., welded) to the second surface 116b of the second cover 116 at respective side edges of the second cover 116. At the front and rear of each cover mechanism 56, the pivot mount 112 includes a pivot pin 115 that extends through the flange 96 of the respective single frame member 95a, 95b, the ear adjacent to that frame member 95a, 95b, and a suitable number of spacers (e.g., washers) positioned between that frame member 95a, 95b and the ear, with a cotter pin to retain the pivot pin 114a in place. At the middle of each cover mechanism 56, the pivot mount 112 includes a longer pivot pin 115 that extends through the two respective intermediate frame members 95c, the ears of the two second covers 110, and a suitable number of spacers (e.g., washers) positioned between the ear of each of the two second covers 110 and the two intermediate frame members 95c, with a cotter pin to retain the pivot pin 114a in place. As such, adjacent second covers 110 of the cover mechanism 54 share a longer pivot pin 115. The pivot pins 115 associated with each second cover 110 cooperate to define the pivot axis 114 of that second cover 110.

Referring to FIGS. 4-9, each cover actuator 58 may include an input mechanism 118 (shown diagrammatically) to move the four-bar linkage 62 between opened and closed positions. The input mechanism 118 may be configured in a wide variety of ways. For example, the input mechanism 118 may apply an input force 120 to the four-bar linkage 62, such as to one or both of the rear first link 67 of the front linkage unit 62a and the front first link 67 of the rear linkage unit 62b. Each input mechanism 118 may have a motor 118a and a threaded rod 118b. The motor 118a may be fixed to a support structure 122 (e.g., configured as a weldment) for the threshing concave 38 so as to avoid relative movement between such support structure 120 and the threshing concave support frame 90 (e.g., configured as another weldment). In some examples, the motor 118a may be mounted to the support frame 90 itself. In other examples, the motor 118a may be mounted to other part(s), but, software may be needed to adjust the covers 60 to compensate in the event of relative motion between such other part(s) and the threshing concave 38.

The motor 118a may be coupled to the threaded rod 118b to advance and retract the threaded rod 118b. The threaded rod 118b may be pivotally coupled to one or both of the rear first link 67 of the front linkage unit 62a and the front first link 67 of the rear linkage unit 62b. The motor 118a advances the threaded rod 118b to move the composite four-bar linkage 62 and the first covers 60 coupled thereto from the opened position to the closed position, with the first covers 60 advancing the second covers 110 therewith. The motor 118a retracts the threaded rod 118b to move the four-bar linkage 62 and the first covers 60 coupled thereto from the closed position to the opened position, with the second covers 110 moving therewith under the influence of gravity upon release by the first covers 60.

It is to be appreciated that the input mechanism 118 may be configured in a wide variety of ways. In general, the force from a hydraulic cylinder or linear actuator can be applied anywhere along the linkage 62. The point of attachment of the threaded rod 118b to the linkage 62 may provide a good balance between force and stroke length. In other embodiments, a rotary motor may be used to rotate the axis of each pivot pin 79*a* or other axis or axes.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. A concave assembly for an agricultural combine harvester, the concave assembly comprising:
   a concave comprising a grate,
   a cover having an opened position uncovering at least a portion of the grate, the cover in the opened position configured to allow crop flow through the at least the portion of the grate, and a closed position covering the at least the portion of the grate, the cover in the closed position configured to block crop flow through the at least the portion of the grate, and
   a cover actuator configured to move the cover between the opened position and the closed position, the cover actuator comprising a four-bar linkage operatively coupled to the cover at a first attachment point and a second attachment point.

2. The concave assembly of claim 1, wherein the four-bar linkage translates the cover toward and away from the grate between the opened position and the closed position.

3. The concave assembly of claim 1, wherein the concave comprises a support frame to which the grate is coupled and relative to which the cover moves between the opened and closed positions, and the four-bar linkage comprises a link pivotally mounted to the support frame against translation relative thereto, the link comprises a first end portion pivotally mounted to the support frame, a second end portion pivotally coupled to another link of the four-bar linkage, and an intermediate portion positioned between the first end portion and the second end portion and pivotally coupled to another link of the four-bar linkage.

4. The concave assembly of claim 1, wherein the concave comprises a support frame to which the grate is coupled, the support frame comprises a track, a link of the four-bar linkage and another link of the four-bar linkage are pivotally coupled to one another via a pivot joint of the four-bar linkage, and the pivot joint is coupled to the track to follow the track when the cover moves between the opened position and the closed position.

5. The concave assembly of claim 1, wherein the cover comprises an attachment point, the four-bar linkage comprises a link, and the attachment point and a slot of the link are coupled to one another for relative slidable movement therebetween.

6. The concave assembly of claim 1, wherein the cover comprises an attachment point, the four-bar linkage comprises a link, the link comprises a first end portion pivotally coupled to another link of the four-bar linkage, a second end portion pivotally coupled to the attachment point, and an intermediate portion positioned between the first end portion and the second end portion and pivotally coupled to another link of the four-bar linkage.

7. The concave assembly of claim 1, comprising a second cover, wherein the cover is a first cover, the second cover is pivotally mounted and positioned at least partially between the first cover and the grate such that movement of the first cover by the four-bar linkage from the opened position to the closed position urges the second cover to a closed position covering at least a second portion of the grate to block crop flow through the at least the second portion of the grate.

8. The concave assembly of claim 1, wherein the concave comprises a support frame to which the grate is coupled and relative to which the cover moves between the opened and closed positions, the four-bar linkage comprises a first link, a second link, a third link, and a fourth link, the first link is pivotally mounted to the support frame against translation relative thereto, each of the first link and the third link is pivotally coupled to the second link and the fourth link such that the first link and the third link are opposite one another in the four-bar linkage and the second link and the fourth link are opposite one another in the four-bar linkage, the third link is pivotally coupled to the first attachment point, and the fourth link is pivotally coupled to the second attachment point.

9. The concave assembly of claim 8, wherein the first link comprises a first end portion pivotally mounted to the support frame, a second end portion pivotally coupled to the fourth link, and an intermediate portion positioned between the first end portion and the second end portion and pivotally coupled to the second link.

10. The concave assembly of claim 8, wherein the support frame comprises a track, the second link and the third link are pivotally coupled to one another via a pivot joint of the four-bar linkage, and the pivot joint is slidably coupled to the track to translate along the track when the cover moves between the opened position and the closed position.

11. The concave assembly of claim 8, wherein the third link comprises a slot extending lengthwise of the third link, and the first attachment point and the slot are coupled to one another for relative slidable movement therebetween when the cover moves between the opened position and the closed position.

12. The concave assembly of claim 8, wherein the fourth link comprises a first end portion pivotally coupled to the first link, a second end portion pivotally coupled to the second attachment point, and an intermediate portion positioned between the first end portion and the second end portion and pivotally coupled to the third link.

13. The concave assembly of claim 8, wherein the support frame comprises a track, each of the first link, the second link, the third link, and the fourth link comprises a first end portion and a second end portion, the first end portion of the first link is pivotally mounted to the support frame, the second end portion of the first link and the first end portion of the fourth link are pivotally coupled to one another, the first end portion of the second link is pivotally coupled to an intermediate portion of the first link positioned between the first and second end portions of the first link, the second end portion of the second link and the first end portion of the third link are pivotally coupled to one another via a pivot joint of the four-bar linkage, the pivot joint is slidably coupled to the track to translate along the track when the cover moves between the opened position and the closed position, the third link comprises a slot extending lengthwise of the third link between the first and second end portions of the third link, the first attachment point and the slot are coupled to one another for relative slidable movement therebetween when the cover moves between the opened position and the closed position, the second end portion of the third link is pivotally coupled to an intermediate portion of the fourth link positioned between the first and second end portions of the fourth link, and the second end portion of the fourth link is pivotally coupled to the second attachment point.

14. The concave assembly of claim 1, wherein:
   the four-bar linkage comprises a first set of links and a second set of links coupled to the first set of links, each of the first set of links and the second set of links comprises a first link, a second link, a third link, and a fourth link, the four-bar linkage comprises a first set of attachment points associated with the first set of links and a second set of attachment points associated with the second set of links, the first set of attachment points comprises the first attachment point and the second attachment point, the second set of attachment points comprises a first attachment point and a second attachment point, and with respect to each of the first and second sets of links and the first or second set of attachment points associated therewith, the first link is pivotally mounted to the support frame against translation relative thereto, each of the first link and the third link is pivotally coupled to the second link and the fourth link such that the first link and the third link are opposite one another in the four-bar linkage and the second link and the fourth link are opposite one another in the four-bar linkage, the third link is pivotally coupled to the first attachment point, and the fourth link is pivotally coupled to the second attachment point.

* * * * *